K. W. BARTLETT.
LIQUID TREATING APPARATUS.
APPLICATION FILED SEPT. 23, 1907.
926,842.
Patented July 6, 1909.
2 SHEETS—SHEET 1.
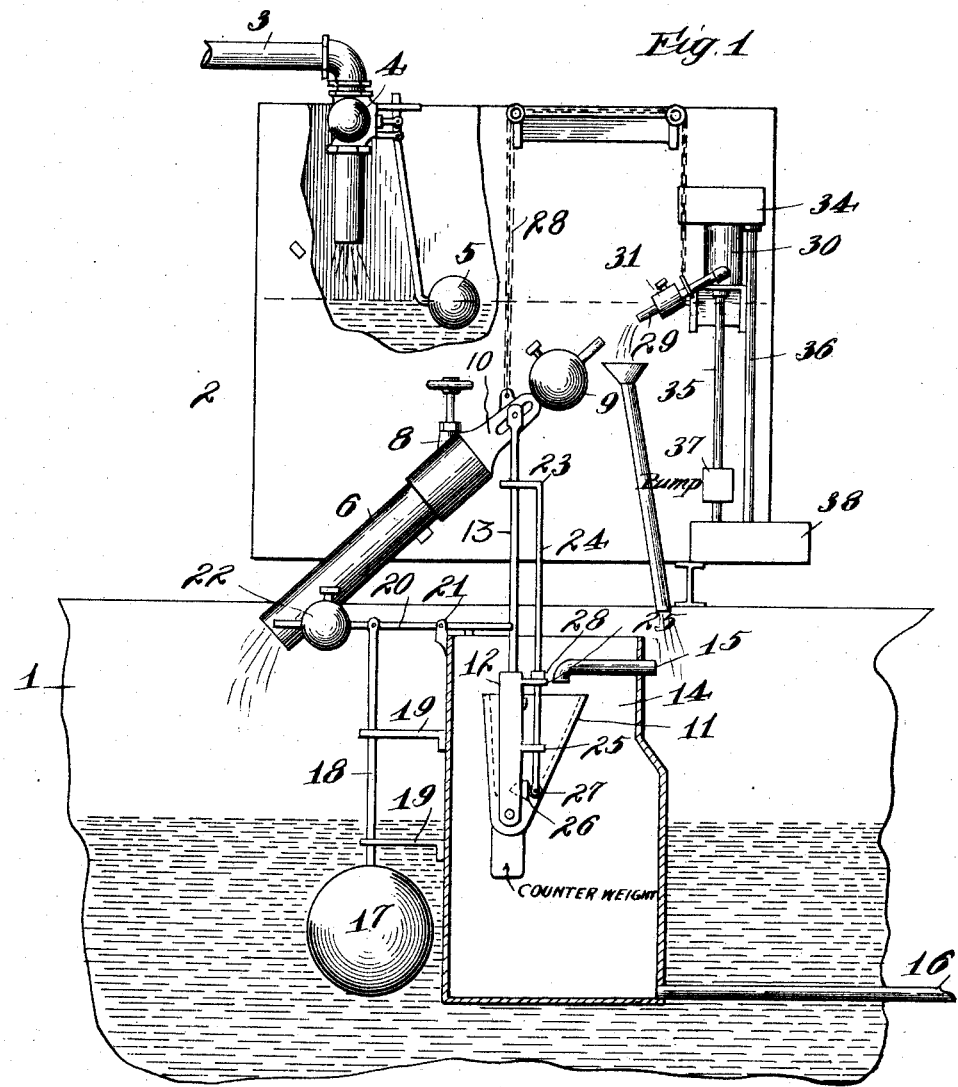

K. W. BARTLETT.
LIQUID TREATING APPARATUS.
APPLICATION FILED SEPT. 23, 1907.
926,842.
Patented July 6, 1909.
2 SHEETS—SHEET 2.
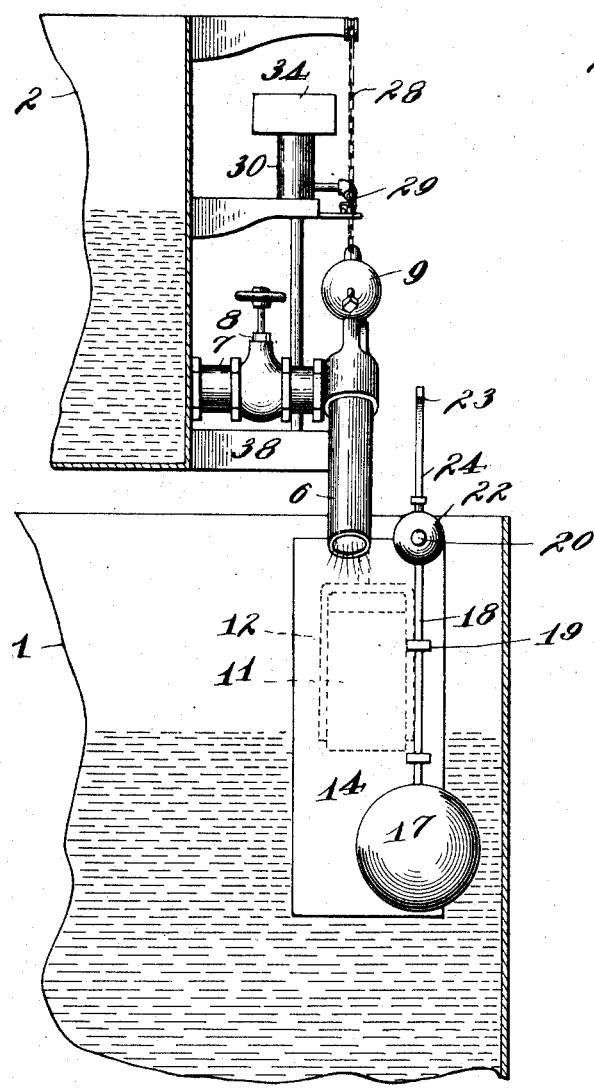
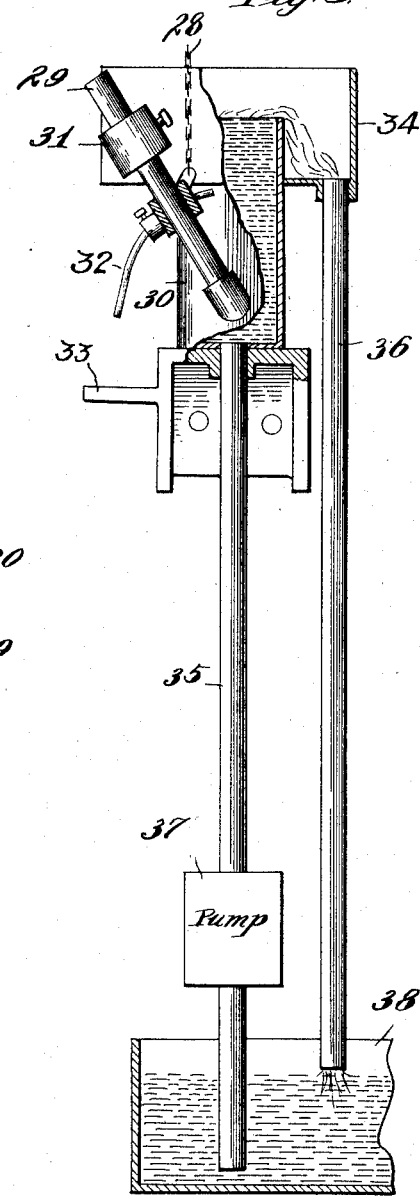

UNITED STATES PATENT OFFICE.

KENT W. BARTLETT, OF MADISON, WISCONSIN, ASSIGNOR TO NORTHERN WATER SOFTENER COMPANY, OF MADISON, WISCONSIN, A CORPORATION OF MAINE.

LIQUID-TREATING APPARATUS.

No. 926,842.  Specification of Letters Patent.  Patented July 6, 1909.

Application filed September 23, 1907. Serial No. 394,232.

*To all whom it may concern:*

Be it known that I, KENT W. BARTLETT, citizen of the United States, residing at Madison, in the county of Dane and State of Wisconsin, have invented a certain new and useful Improvement in Liquid-Treating Apparatus, of which the following is a full, clear, concise, and exact description, reference being had to the accompanying drawings, forming a part of this specification.

My invention relates to apparatus for governing the flow of material or liquid, and finds a very useful embodiment in water softening apparatus and the invention will be specifically described as embodied in a water softening apparatus, though it is not to be limited thereto.

It is one object of my invention to govern the supply of chemical to the settling tank by the water within the settling tank, additional chemical being supplied to the tank when additional water is added to the tank. The same mechanism that works within the settling tank for the purpose of controlling the supply of chemical to said tank, desirably also controls the supply of additional water to the tank. The mechanism operating within this tank preferably intermittently effects communication between the settling tank and the fresh water supply and between the settling tank and the chemical supply, the mechanism within the tank operating when the water within the tank has been drawn off to a predetermined extent for purpose of use. There is desirably provided an adjusting means for governing the rate of flow either of the incoming water or of the incoming chemical, whereby the chemical and the water may be suitably proportioned in quantity, there being preferably two adjusting devices, one for the water and the other for the chemical, though I do not wish to be limited to the use of the two adjusting devices, as the proportions of chemical and water may be determined by the use of but one adjusting device.

Another feature of my invention relates to the mechanism for supplying chemical to the settling tank, and another feature of my invention respects the mechanism by which fresh water is intermittently supplied to the settling tank. By means of the latter two features of my invention, valves are eliminated.

I will explain my invention more fully by reference to the accompanying drawings, showing the preferred embodiment thereof, in which—

Figure 1 is a view somewhat diagrammatic but sufficiently comprehensive to show the general nature of the invention. Fig. 2 is a side elevation of the structure shown in Fig. 1. Fig. 3 is a detail view, partially in section and partially in elevation, of the chemical supply mechanism, a chemical reservoir and a circulating pump being indicated at the lower part of the figure. Fig. 4 is a plan view of a bucket entering into the construction of the mechanism associated with the settling tank for controlling the supply of fresh water and chemical to the settling tank. Fig. 5 shows a detail of a cam device entering into my preferred construction.

Like parts are indicated by similar characters of reference throughout the different figures.

The settling tank, which is well-known in the art, is indicated at 1. Above it, there is illustrated a constant level chamber 2 that first receives the water to be treated and from which the water is discharged into the settling tank by the mechanism to be described. The constant level chamber receives water from the supply pipe 3 connected to any suitable source of supply, there being a valve 4 of well-known construction included within this pipe and governed in its action by a float 5 connected therewith, the float sinking whenever the level of the water in the chamber 2 recedes from its predetermined location to effect an operation of the valve 4 to permit the supply of enough water to the chamber 2 to restore the level. An oscillating discharge pipe 6 has communication with the interior of the chamber 2, this pipe being mounted to oscillate upon a section of piping 7 extending toward the chamber 2 and including a valve 8, whereby the rate of flow through the pipe 6 may be regulated. An adjustable riding weight 9 is mounted upon an extension 10 secured to the piping 6, whereby said piping is nicely balanced.

A bucket 11 is swung from a bail 12, which bail has a stem 13 that has pin and slot connection with the extension 10. The weight of this bucket 11 is such that when it is empty, the pipe 6 may of its own weight, fall, but when this bucket is full of water, sufficient weight will be added to the extension 10 to cause the pipe 6 to rise. The bucket 11 is filled when the water within the tank 1 reaches or has about reached its upper limiting level, whereupon the pipe 6 is raised to cut off the flow of water from the chamber 2 to the settling tank. I provide restraining mechanism that prevents the bucket from tipping due to the weight of the water therein, until the water in the settling tank has reached a predetermined lower level. When this lower level has been reached, the bucket rotates upon its bail pivots, due to the weight of the water in the bucket, permitting the water to empty into the chamber 14 to lighten the weight upon the extension 10, whereupon the pipe 6 swings downwardly to discharge water from the chamber 2 to the settling tank 1. A pipe 15 permits the entry of water from the space about the chamber 14 (this chamber 14 being preferably surrounded by the water in the tank 1) to the bucket 11, said bucket after having received sufficient water through the pipe 15, causing the elevation of the pipe 6 by reason of the water in the bucket 11 to cut off the flow of fresh water from the chamber 2 to the settling tank. The chamber 14 is itself to be kept sufficiently clear of water at all times to permit the weight of the water in the bucket 11 to be effective in causing the pipe 6 to rise and to be effective to cause a tilt of the bucket when the restraining mechanism is relieved of influence upon the bucket when the water in the settling tank has reached the neighborhood of the lower limiting level. For this purpose I desirably provide an eduction pipe 16 leading to any suitable place, and inasmuch as the amount of water used in the operation of the bucket 11 is very small as compared with the total quantity of water in the settling tank, the eduction pipe 16 may lead to a sewer or waste pipe. After the bucket 11 has been relieved of the influence of the restraining mechanism thereupon, the water in the bucket causes the bucket to tilt, so as to empty the bucket, as has hitherto been set forth, whereafter the bucket, by reason of the disposition of the metal composing the same, restores itself to its vertical position, in which position the restraining mechanism may resume its influence upon the bucket upon rise of the water in the settling tank 1. I do not, however, wish to be limited to the form of restraining mechanism that enters into the control of the bucket, nor do I wish to be limited to the use of a bucket for accomplishing the purpose herein set forth.

In the embodiment of the invention herein shown, the restraining mechanism includes a float 17 of comparatively large size, provided with a vertically moving stem 18 suitably directed in its travel by guides 19, a lever 20 pivoted between its ends at 21 and having an adjustable counter-weight 22 upon one end and adapted for engagement with the nose 23 provided upon the upper end of a vertically traveling rod 24 which is directed in its travel by means of guides 25 projecting from the bail 12 of the bucket. The body of the bucket carries a cam lug 26 adapted for engagement with a roller 27 provided upon the lower end of the rod 24, the vertical face of the lug 26 normally engaging the said roller to hold said bucket in vertical place. The rod 24 works downwardly by the force of gravity, said rod being limited in its downward travel by the lug 28 adapted for engagement with the upper one of the guides 25, whereby the roller 27 is insured engagement with the vertical face of the lug 26. The roller 27 when thus in engagement with the lug 26, holds the bucket 11 in its vertical place, so that said bucket may become filled to an extent that will force the elevation of the pipe 6. The bucket is maintained in vertical position until the float 17 has been permitted to descend a sufficient distance, consequent upon the removal of sufficient water from the settling tank for purposes of use, the stem 18 then drawing the lever 20 downwardly and forcing engagement between the nose 23 and said lever 20, thereby effecting the elevation of the rod 24 and the disengagement of the roller 27 from the cam 26, the water in the bucket 11 thereupon effecting the rotation of said bucket to permit the water to be emptied therefrom, whereupon the weight furnished by the water in the bucket to force an elevation of the pipe 6 is removed, permitting said pipe to descend to permit the flow of fresh water from the chamber 2 to the settling tank.

The same mechanism that effects the admission of fresh water to the settling tank desirably also controls the admission of chemical to the settling tank, to which end I provide a chain connection 28 between the bucket mechanism and a chemical discharge spout 29, which is desirably swingingly mounted or rotatively mounted, as is the water discharge pipe 6, this chemical discharge pipe having communication with a chemical receptacle 30. The connection between the chain 28 or other power transmission connection and the bucket mechanism 11 is desirably effected by connecting the said chain with the pipe extension 10. The discharge spouts 6 and 29 are, by the apparatus illustrated, permitted to be elevated at the same time and to be lowered at the same time, so that the flow of fresh water and fresh chemical to the settling tank begins and ends substantially simultaneously. I do not wish to be limited to the use of swinging spouts for controlling the admission of chemical and water to the settling tank.

It will be seen that the water and chemical are supplied only intermittently to the settling tank, so that the water in said tank is permitted to be quiet during the time that there is no flow of fresh water and chemical to the tank. The spout 29 is desirably provided with an adjustable weight 31 to adjust the force with which said spout may fall, while the extent to which said spout 29 may fall may be regulated by an adjustable extension 32 which engages a stop 33 when the spout has descended the preregulated distance.

The source of immediate supply of chemical to the discharge spout 29 is of novel construction, as indicated most clearly in Fig. 3, there being there illustrated a jacket 34 about the upper end of the chamber 30, a supply pipe 35 leading to the chamber 30, while an eduction pipe 36 leads from the jacket chamber 34, which latter pipe removes the chemical which overflows from the chamber 30 into the surrounding chamber 34. A pump 37 forces the chemical from a suitable chemical reservoir 38 through the pipe 35 to the chamber 30, from which chamber the chemical is either totally discharged through the chamber 34 and the pipe 36 or is but partially discharged through said latter chamber and pipe when the chemical is being discharged through the spout 29. By this arrangement a uniform quantity of liquid chemical is always present to insure a uniform flow of the chemical through the spout 29. The liquid is passed upwardly through the pipe 35 and upwardly through the chamber 30, thereby to agitate the chemical in said chamber 30.

By reason of the constant level chamber 2 and the chemical supply chamber 30, the water and liquid chemical are supplied to the settling chamber at uniform pressures, insuring the supply to the tank of correct proportions of water and chemical. The water either flows at a fixed pressure and volume or not at all and the chemical is either flowing at a fixed pressure and volume or not at all.

I prefer the chemical in liquid form for supply to the settling tank. By liquid chemical I do not necessarily mean a solution, as the chemical may be held in suspense within the water, the water with the suspended chemical constituting a liquid chemical as I use the expression.

I have herein shown my invention as embodied in water softening apparatus, but I do not wish to be limited to this application of the invention, as I desire to have the invention protected irrespective of the use to which it is put.

Having thus described my invention, I claim as new and desire to secure by Letters-Patent the following:—

1. Apparatus of the class described including a liquid-receiving tank, a source of chemical supply for said tank, mechanism for governing chemical flow to said tank and operated by the liquid within the tank when said liquid has reached a predetermined upper level to cut off the chemical flow to the tank, and operable when the liquid in the tank has reached a predetermined lower level, to renew the chemical flow to the tank, and restraining mechanism governed by the liquid in the tank for preventing the aforesaid mechanism from operating during the time the liquid in the tank is descending from one level to the other level.

2. Apparatus of the class described including a liquid-receiving tank, a source of chemical supply for said tank, mechanism for governing chemical flow to said tank and operated by the liquid within the tank when said liquid has reached a predetermined upper level to cut off the chemical flow to the tank, and operable when the liquid in the tank has reached a predetermined lower level, to renew the chemical flow to the tank, and restraining mechanism governed by the liquid for preventing the aforesaid mechanism from operating during the time the liquid in the tank is descending from one level to the other level.

3. Apparatus of the class described including a liquid-receiving tank, a source of supply for said tank, means for effecting flow from said supply to said tank and for effecting the discontinuation of said flow, mechanism for effecting the operation of said means, said mechanism including a bucket, which when sufficiently empty of liquid, will permit said means to operate to effect a flow to the tank, and when containing sufficient liquid, will operate upon said means to effect a discontinuation of said flow, and mechanism for governing the discharge of liquid from said bucket and brought into operation to bring about such discharge by the liquid in the tank when it has reached a predetermined lower level, whereupon flow into the tank may be resumed.

4. Apparatus of the class described including a liquid-receiving tank, a source of chemical supply for said tank, mechanism for governing chemical flow to said tank and operable when the liquid has reached alternative levels to renew or cut off the flow to the tank, and restraining mechanism governed by the liquid for preventing the aforesaid mechanism from operating during the time the liquid is shifting from one level to the other level.

5. Apparatus of the class described including a liquid-receiving tank, a source of liquid supply for said tank, mechanism for governing flow to said tank and including a bucket adapted to receive liquid supplied from said source and operable when the liquid has reached alternative levels to renew or cut off the flow to the tank, and restraining mechanism governed by the liquid for preventing the aforesaid mechanism from operating during the time the liquid is shifting from one level to the other level.

6. Apparatus of the class described including a liquid-receiving tank, a source of supply for said tank, mechanism for governing flow to said tank and including a bucket adapted to receive liquid from the tank and operated by the liquid within the tank when said liquid has reached a predetermined upper level to cut off the flow, and operable when the liquid in the tank has reached a predetermined lower level to renew the flow, and restraining mechanism governed by the liquid in the tank for preventing the aforesaid mechanism from operating during the time the liquid in the tank is descending from one level to the other level.

7. Apparatus of the class described including a liquid-receiving tank, a source of liquid supply for said tank furnishing liquid to the tank at constant pressure, mechanism for governing flow to said tank and operated by the liquid within the tank when said liquid has reached a predetermined upper level to cut off the flow, and operable when the liquid in the tank has reached a predetermined lower level to renew the flow to the tank, and restraining mechanism governed by the liquid in the tank for preventing the aforesaid mechanism from operating during the time the liquid in the tank is descending from one level to the other level.

8. Apparatus of the class described including a liquid-receiving tank, a source of liquid supply for said tank furnishing liquid to the tank at constant pressure, mechanism for governing flow to said tank and operable when the liquid has reached alternative levels to renew or cut off the flow to the tank, and restraining mechanism governed by the liquid for preventing the aforesaid mechanism from operating during the time the liquid is shifting from one level to the other level.

9. Apparatus of the class described including a liquid-receiving tank, a source of liquid supply for said tank furnishing liquid to the tank at constant pressure, mechanism for governing flow to said tank and including a bucket adapted to receive liquid supplied from said source, and operable when the liquid has reached alternative levels to renew or cut off the flow to the tank, and restraining mechanism governed by the liquid for preventing the aforesaid mechanism from operating during the time the liquid is shifting from one level to the other level.

10. Apparatus of the class described including a liquid-receiving tank, a source of liquid supply for said tank furnishing liquid to the tank at constant pressure, mechanism for governing flow to said tank and including a bucket adapted to receive liquid from the tank and operated by the liquid within the tank when said liquid has reached a predetermined upper level to cut off the flow, and operable when the liquid in the tank has reached a predetermined lower level to renew the flow to the tank, and restraining mechanism governed by the liquid in the tank for preventing the aforesaid mechanism from operating during the time the liquid in the tank is descending from one level to the other level.

11. Apparatus of the class described including a liquid-receiving tank, a source of supply for said tank, means for effecting flow to said tank and for effecting the discontinuation of said flow, mechanism for effecting the operation of said means, said mechanism including a bucket, which when sufficiently empty of liquid will permit said means to operate to effect flow to the tank, and when containing sufficient liquid will operate upon said means to effect a discontinuation of said flow, mechanism for governing the discharge of liquid from said bucket and brought into operation to bring about such discharge by the liquid in the tank when it has reached a predetermined lower level, whereupon flow into the tank will be established, and a chamber containing said bucket, there being means for conveying the liquid from the tank through the chamber to said bucket when the liquid in the tank reaches a predetermined level, whereby the said bucket is prevented from receiving liquid until the liquid reaches an upper level in the tank.

12. An apparatus of the class described including a liquid-receiving tank, a source of supply therefor, an oscillating spout for establishing flow to the tank, mechanism for controlling the oscillation of the spout, and, in turn, governed by the liquid in the tank, and mechanism for preventing the operation of the aforesaid mechanism during the descent of the liquid in the tank between predetermined levels.

13. An apparatus of the class described including a liquid-receiving tank, a source of supply therefor, a bucket adapted to receive liquid from said tank, and mechanism governed by said bucket for controlling the flow from said source to said tank, said mechanism being operable when the liquid within the tank reaches alternative levels.

14. An apparatus of the class described including a liquid-receiving tank, a source of supply therefor, an oscillating spout having communication at one end with the source of supply and adapted to discharge into the tank at its other end, and mechanism for controlling the oscillation of the spout to prevent or permit flow through said spout and, in turn, governed by the liquid.

15. An apparatus of the class described including a liquid-receiving tank, a source of supply, an oscillating pipe having communication with the tank at one end and adapted to discharge into the tank at its other end when said pipe is depressed at its discharge end, and automatically operating mechanism for elevating the pipe to prevent flow therethrough and for depressing the pipe to permit flow therethrough.

16. An apparatus of the class described including a liquid-receiving tank, a source of supply therefor, an oscillating spout having communication at one end with the source of supply and adapted to discharge into the tank at its other end, and mechanism for controlling the oscillation of the spout to prevent or permit flow therethrough from said source of supply and in turn, governed by the liquid in the tank.

17. Apparatus of the class described including a liquid-receiving tank, a source of supply therefor, and mechanism governed by the level of the liquid in the tank serving to establish flow to said tank when the liquid in the tank reaches a predetermined lower level and serving to cut off the flow to said tank when the liquid in the tank reaches a predetermined upper level, said mechanism including a bucket having fluid-conducting means for conveying liquid to the bucket from the tank and permitting the discharge of said liquid.

18. Apparatus of the class described including a liquid-receiving tank, a source of supply therefor in the form of a constant level chamber, and mechanism governed by the level of the liquid in the tank serving to establish flow to said tank when the liquid in the tank reaches a predetermined lower level and serving to cut off the flow to said tank when the liquid in the tank reaches a predetermined upper level, said mechanism including a bucket having fluid-conducting means for conveying liquid to the bucket from the tank and permitting the discharge of said liquid.

19. An apparatus of the class described including a liquid-containing chamber 30 having a discharge, as 29, below its upper level, a chamber 34 into which the liquid in the chamber 30 may overflow and having its lower portion below the upper level of the chamber 30 and having a discharge 36, a pipe 35 leading into the chamber 30 near the bottom thereof for admitting liquid into said chamber 30 and to agitate the same, and mechanism for effecting circulation upwardly through the pipe 35 and through said chamber 34.

20. Apparatus of the class described including a source of liquid supply, a source of chemical supply, a bucket, a liquid-receiving tank located beneath the bucket and adapted to receive liquid from the source of liquid supply, means for conveying liquid from the liquid-receiving tank to the bucket, and mechanism, governed by the bucket, for controlling the flow of chemical from said source of chemical supply to said receiving tank.

21. Apparatus of the class described including a liquid-receiving tank, a source of chemical supply for supplying chemical to the receiving tank, a bucket adapted to receive liquid from said receiving tank, mechanism governed by said bucket for controlling the flow of chemical from said source of chemical supply to said receiving tank, and means for preventing said mechanism from operating while the liquid in said receiving tank is between alternative levels.

22. Apparatus of the class described including a liquid-receiving tank, a source of liquid supply therefor, a source of chemical supply for said tank, mechanism for governing the flow of chemical and liquid to said tank and operated by the liquid within the tank when said liquid has reached a predetermined upper level to cut off the flow of chemical and liquid to the tank, and operable when the liquid in the tank has reached a predetermined lower level, to renew the flow of chemical and liquid to the tank, and restraining mechanism governed by the liquid in the tank, for preventing the aforesaid mechanism from operating during the time the liquid in the tank is moving from one level to the other.

23. Apparatus of the class described including a liquid-receiving tank, a source of liquid supply therefor, a source of chemical supply for said tank, mechanism for governing the flow of chemical and liquid to said tank and operated by the liquid within the tank when said liquid has reached a predetermined upper level, to cut off the flow of chemical and liquid to the tank, and operable when the liquid in the tank has reached a predetermined lower level, to renew the flow of chemical and liquid to the tank, and restraining mechanism governed by the liquid, for preventing the aforesaid mechanism from operating during the time the liquid in the tank is moving from one level to the other.

In witness whereof, I hereunto subscribe my name this 12th day of September A. D., 1907.

KENT W. BARTLETT.

Witnesses:
G. L. CRAGG,
L. G. STROH.